United States Patent
Bernard et al.

(10) Patent No.: US 9,442,555 B2
(45) Date of Patent: Sep. 13, 2016

(54) METHOD OF CONTROL OF AN ACCESS POINT OF A HOME GATEWAY OF A HOME NETWORK

(75) Inventors: David Bernard, Marcille Raoul (FR); Gérard Cordelier, Saint Medard sur Ille (FR)

(73) Assignee: FRANCE TELECOM, Paris (FR)

(*) Notice: Subject to any disclaimer, the term of this patent is extended or adjusted under 35 U.S.C. 154(b) by 286 days.

(21) Appl. No.: 13/639,992

(22) PCT Filed: Apr. 7, 2011

(86) PCT No.: PCT/FR2011/050784
§ 371 (c)(1),
(2), (4) Date: Dec. 18, 2012

(87) PCT Pub. No.: WO2011/124853
PCT Pub. Date: Oct. 13, 2011

(65) Prior Publication Data
US 2013/0097446 A1    Apr. 18, 2013

(30) Foreign Application Priority Data
Apr. 8, 2010 (FR) ...................................... 10 52656

(51) Int. Cl.
*G06F 1/32* (2006.01)
*H04L 12/28* (2006.01)

(52) U.S. Cl.
CPC ......... *G06F 1/3234* (2013.01); *H04L 12/2834* (2013.01); *H04L 12/2898* (2013.01); *H04L 2012/2841* (2013.01)

(58) Field of Classification Search
CPC .............................. H04L 12/28; H04W 52/02
USPC .................. 713/320, 323, 324; 370/311, 318
See application file for complete search history.

(56) References Cited

U.S. PATENT DOCUMENTS 8,849,899 B1 * 9/2014 L'Heureux et al. .......... 709/203
2005/0122919 A1    6/2005 Touag
(Continued)

FOREIGN PATENT DOCUMENTS

DE    202004017602 U1    3/2005
WO    2010034932 A1    4/2010

OTHER PUBLICATIONS

International Preliminary Report on Patentability and English translation of the Written Opinion dated Oct. 9, 2012 for corresponding International Application No. PCT/FR2011/050784, filed Apr. 7, 2011.
(Continued)

*Primary Examiner* — Vincent Tran
(74) *Attorney, Agent, or Firm* — David D. Brush; Westman Champlin & Koehler, P.A.

(57) ABSTRACT

A method of controlling a domestic gateway, intended to connect at least one domestic terminal of a domestic computer network to a telecommunication network. The domestic gateway includes an access point configured so as to establish a connection between the domestic terminal and the domestic gateway. Method includes: a step of verifying the state of the connection between the domestic gateway and the domestic terminal via the access point, and a step of cyclically placing the access point on standby if the connection is inactive, in which the access point is alternately enabled for a duration of activity and disabled for a duration of sleep.

9 Claims, 2 Drawing Sheets

(56) References Cited

U.S. PATENT DOCUMENTS

| | | |
|---|---|---|
| 2005/0220137 A1* | 10/2005 | Prigent et al. ............... 370/449 |
| 2006/0137005 A1* | 6/2006 | Park ............................... 726/21 |
| 2008/0139117 A1 | 6/2008 | Madine et al. |
| 2009/0207824 A1* | 8/2009 | Lee et al. ..................... 370/338 |
| 2010/0002610 A1* | 1/2010 | Bowser et al. ............... 370/311 |
| 2010/0008276 A1 | 1/2010 | Kopikare et al. |
| 2010/0039974 A1* | 2/2010 | Toshimitsu ....... H04W 52/0225 370/311 |
| 2010/0087208 A1* | 4/2010 | Lister ........................ 455/456.5 |
| 2010/0103941 A1* | 4/2010 | Jiang et al. .................. 370/400 |
| 2010/0284316 A1* | 11/2010 | Sampathkumar ............ 370/311 |
| 2010/0285825 A1* | 11/2010 | Doppler et al. .............. 455/509 |
| 2011/0055928 A1* | 3/2011 | Brindza .......................... 726/26 |
| 2011/0069650 A1* | 3/2011 | Singh et al. .................. 370/311 |
| 2011/0246637 A1* | 10/2011 | Murakami ............ H04W 84/20 709/223 |
| 2012/0307630 A1* | 12/2012 | Markwart et al. ............ 370/228 |

OTHER PUBLICATIONS

International Search Report and Written Opinion dated Jul. 5, 2011 for corresponding International Application No. PCT/FR2011/050784, filed Jul. 5, 2011.

* cited by examiner

METHOD OF CONTROL OF AN ACCESS POINT OF A HOME GATEWAY OF A HOME NETWORK

CROSS-REFERENCE TO RELATED APPLICATIONS

This Application is a Section 371 National Stage Application of International Application No. PCT/FR2011/050784, filed Apr. 7, 2011, which is incorporated by reference in its entirety and published as WO 2011/124853 on Oct. 13, 2011, not in English.

STATEMENT REGARDING FEDERALLY SPONSORED RESEARCH OR DEVELOPMENT

None.

THE NAMES OF PARTIES TO A JOINT RESEARCH AGREEMENT

None.

FIELD OF THE DISCLOSURE

The present disclosure relates to the field of home gateways which effect the interface between at least one device of a home network and a telecommunication network, and relates, more particularly, to a method of control of a home gateway so as to save energy.

BACKGROUND OF THE DISCLOSURE

A home network is a computerized network which links together, in a wire-based or wireless manner, the appliances and devices of a house that are able to inter-communicate. A home network generally comprises a home gateway which fulfills a network switch function by linking the devices of the house in a wire-based manner. The home gateway furthermore comprises a modem, of the ADSL type, configured to link the home network to a telecommunication network of the Internet type. Thus, if a sole computer is linked to the home gateway, the home network consists solely of said computer and of said gateway.

A home gateway, for example known by the protected trade name "livebox", generally comprises a wireless access point using, in particular, wireless transmission technology based on the IEEE 802.11 radioelectric network standard and its upgrades, grouped together under the term Wifi (for "Wireless Fidelity").

To access the home network with a device having a radio link, such as a laptop computer, a user inputs the network identification parameters into his device. In particular, he inputs or selects the name of the home network, known to the person skilled in the art under the abbreviation SSID (for "Service Set Identifier"), and, in an optional manner, an access key for the home network, such as a WEP (for "Wired Equivalent Privacy") or WPA (for "WiFi Protected Access") access key.

Hereinafter, the term device is understood to mean any item of equipment able to connect to the home gateway in a radio manner, such as a laptop computer or an item of equipment of the PDA type (for "Personal Digital Assistant") known by the English name "Smartphone".

The access point is generally activated by default in the home gateway, thereby allowing a device to connect to the home gateway when it so wishes. In practice, a user's devices connect only intermittently to said access point. Thus, most of the time, in particular at night, the access point is activated though it is unused.

It has been calculated that a home gateway needlessly consumes up to 1 Watt for an access point using 802.11 a/b/g technology and up to 2 Watts for an access point using 802.11n technology coupled with MIMO technology, known to the person skilled in the art under its English name "Multiple-Input Multiple-Output".

To save energy, an immediate solution would be for the user to turn off his home gateway when it is not used. This presents drawbacks when the home gateway relays so-called VOIP ("Voice Over Internet Protocol") telephonic communications. Indeed, no telephonic communication may be received when the gateway is turned off. To be able to re-access the home network via the access point, the user must manually turn on the gateway, this being constraining.

SUMMARY

An exemplary embodiment of the invention relates to a method of control of a home gateway intended to connect at least one home terminal of a computerized home network to a telecommunication network, the home gateway comprising an access point configured to establish a connection between said home terminal and the home gateway, the method comprising a step of verifying the state of the connection between the home gateway and said home terminal via the access point, and a step of cyclically placing said access point on standby if said connection is inactive, in which the access point is alternately turned on for a duration of activity and turned off for a duration of sleep. On cyclic standby, the access point is woken up intermittently so as to limit the interruptions of service of the access point. When several home terminals are connected to the access point of the gateway, the method places the access point on standby if all the home terminals are inactive.

According to a variant, the access point comprises a radio communication module, the method places said module on standby if the connection is inactive.

According to an embodiment of the invention, the access point is placed on standby to limit the energy consumption of the home gateway, the other functions of the home gateway still being operational (telephony, network switch, etc.). Furthermore, as placement on standby is automatic, no specific action of the user is necessary, this being practical and increasing the prevalence of placement on standby.

According to one mode of implementation, the access point comprising a plurality of functional modules, including a radio communication module configured to establish a radio connection between said home terminal and the home gateway, the method comprises a step of placing the radio communication module of the access point on standby, in which said radio communication module is alternately turned on and turned off while the other functional modules remain turned on. Only the radio communication module, which consumes a significant quantity of energy, is turned off. As the other modules of the access point remain turned on, there is no latency when waking up the communication module, the connection between the home gateway and the home terminal being established without delay.

The cycle ratio $\alpha$, corresponding to the ratio of the duration of activity to the total duration of the cycle, lies between 0.2 and 0.8. Thus, the home gateway produces an energy saving related to the electrical consumption of the access point of between 20% and 80% of total energy consumption. Moreover, such a cycle ratio allows continuity of the service offered by the access point.

According to a variant, the method comprises a step of waking up the access point subsequent to the receipt, by said access point on cyclic standby, of a request for connection to the home gateway of an undefined terminal. Thus, the access point wakes up automatically, the user not having to carry out any specific action on the gateway in order to wake it up or to turn it off.

The method comprises a step of control of the request for connection of said undefined terminal in which the home gateway checks whether the undefined terminal is a home terminal authorized to connect to said access point, the method engaging the step of waking up said access point if the undefined terminal is an authorized terminal, the method disabling the step of waking up said access point if the undefined terminal is not an authorized terminal. Thus, to avoid untimely waking up of the access point, only authorized home terminals allow the waking up of the access point; visitor terminals, whose connection is not desired, being ignored. The energy savings are thus increased significantly by limiting the probability of waking up of the access point.

According to one aspect of an embodiment of the invention, the home gateway possessing a memory in which is stored at least one unique identifier of a home terminal authorized to connect to said access point, the method comprises a step of control of the request for connection of said undefined terminal in which:

the home gateway receives the request for connection to the home gateway of an undefined terminal, the request for connection comprising the unique identifier of the undefined terminal;

the home gateway compares the unique identifier of the undefined terminal, included in the request for connection, with the unique identifier of the home terminal of the memory, the home gateway engaging the step of waking up said access point in the event of correspondence and disabling the step of waking up said access point in the converse case.

By filtering the terminals via their unique identifiers and by authorizing waking up only for home terminals, the waking of the access point is selective and makes it possible to produce significant energy savings.

According to one aspect of an embodiment of the invention, the home gateway possessing a memory in which is stored a table of the connections established between the home gateway and at least one home terminal via the access point, the method comprises a step of reading the table of connections of the memory and a step of placing the access point on standby if the dynamic table does not comprise any connection. By reading the dynamic table of connections, the access point may advantageously be placed on standby in a simple and automatic manner.

An embodiment of the invention also relates to a home gateway intended to connect at least one home terminal of a computerized home network to a telecommunication network, for the implementation of the method presented above, the gateway comprising:

an access point configured to establish a connection between said home terminal and the home gateway;

a memory in which is stored a dynamic table of the connections between the home gateway and at least one home terminal via the access point; and a module for placing on standby designed to cyclically place said access point on standby if the dynamic table does not comprise any connection, by alternately performing a turning on of said access point for a duration of activity and a turning off of said access point for a duration of sleep.

An embodiment of the invention also relates to a computer program for the execution of a method of control such as presented above, as well as to a recording medium in which said program is stored.

BRIEF DESCRIPTION OF THE DRAWINGS

Other characteristics and advantages will become apparent during the description which follows offered in relation to appended figures given by way of nonlimiting examples.

DETAILED DESCRIPTION OF ILLUSTRATIVE EMBODIMENTS

Figure 1:
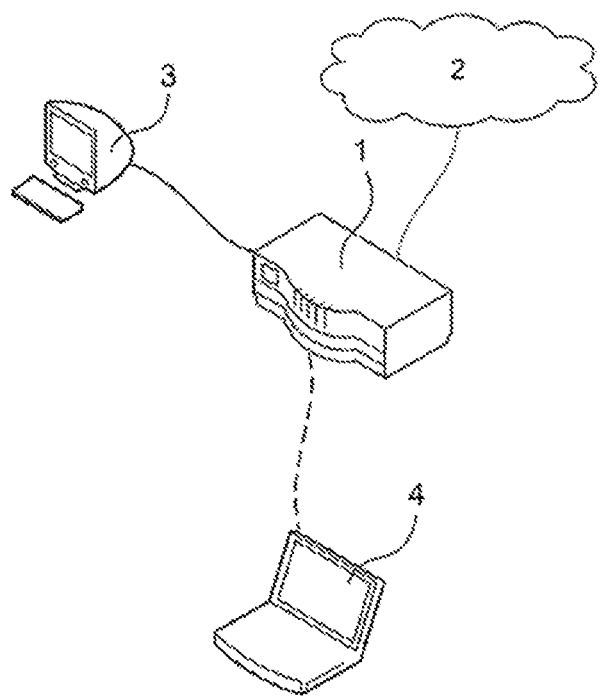
FIG. 1 is a schematic representation of a fixed computer and of a laptop computer establishing connections with a home gateway linked to the Internet network.

With reference to FIG. 1, a home gateway of a home network, hereinafter designated home gateway 1, is linked to the Internet network 2 by a high-speed link of the ADSL type. The home network here is an IP ("Internet Protocol") local network.

Figure 2:
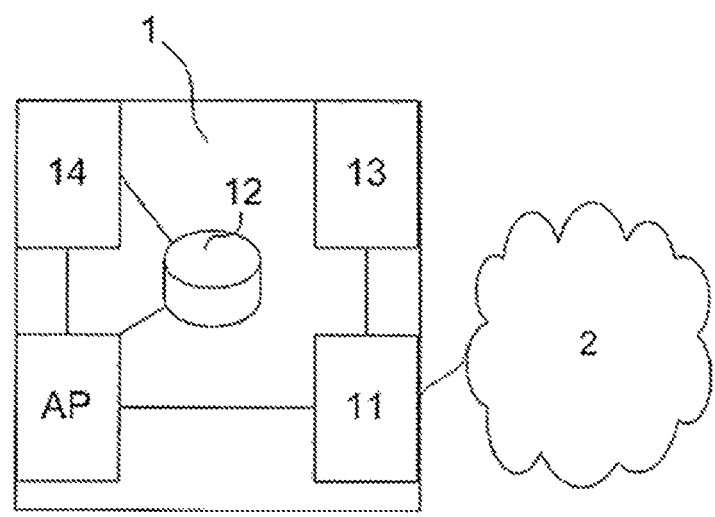
FIG. 2 is a schematic representation of the components of a home gateway according to an embodiment of the invention linked to the Internet network.

With reference to FIG. 2, the home gateway 1, such as that known by the trade name "livebox", here comprises an ADSL modem 11, a network switch 13 making it possible to connect devices in a wire-based manner to the home gateway, an access point AP making it possible to connect devices to the home gateway in a radio manner, for example, via the WiFi protocol, as well as a memory 12 linked to the access point AP storing, inter alia, the parameters for identifying and associating the home devices with the access point AP. The home gateway 1 furthermore comprises a module 14 for placing the access point AP on standby linked to said access point AP.

The devices connected in a wire-based or wireless manner to the home gateway 1 form the home network. When several devices belong to one and the same network, they can exchange data between themselves in a fast and secure manner. Thus, with reference to FIG. 1, the home network comprises a computer 3 linked in a wire-based manner (continuous line in FIG. 1) to the network switch 13 of the home gateway 1 and a laptop computer 4 linked in a radio manner (discontinuous line in FIG. 1) to the access point AP, the home network being linked to the Internet 2 via the ADSL modem 11. The computers 3, 4 are also dubbed home terminals.

In this example, the access point AP of the home gateway 1 comprises a plurality of functional modules (general power supply module, data link module, etc.), including a radio communication module configured to establish a radio connection between a home terminal and the home gateway. Thus, the laptop computer 4 connects to the radio communication module of the access point AP in order to connect to the home gateway 1.

An embodiment of the invention will be presented with a home terminal which is a device which has already been parametrized to access the home network.

Recall that, with reference to FIG. 1, in order to establish a connection between a home terminal 4, here a laptop computer, and the home gateway 1, a user inputs into the home terminal 4 the identification parameters at the access point AP which have been provided by the operator of the home gateway 1. In particular, the home user inputs an identifier of the home network, here the name of the home network, that is to say its SSID, and, in an optional manner, an access key for the home network, such as a WEP or WPA key, defined earlier.

During the first identification of the home terminal at the home gateway 1, the home terminal 4 transmits its MAC (for "Media Access Control") unique physical address, corresponding to the address of its network interface, to the home gateway 1 which saves it in its memory 12 for the subsequent identifications.

Thus, each time that the home terminal 4 wishes to connect to the home gateway 1, the home terminal 4 dispatches a request for connection to the home gateway 1, which comprises the identifier of the home network and the MAC unique physical address of the home terminal 4. As the MAC unique physical address is known to the access point AP, access to the network is granted to the home terminal 4 and a radio connection is established between the home gateway and the home terminal.

The expression "request for connection" is understood to also mean a request in response to a beacon sent by an access point (the beacon and the request in response being respectively known to the person skilled in the art under their English names "beacon" and "probe request", defined by the IEEE 802.11 standard) or a request in association with a terminal without prior sending of a beacon by the access point.

In order for the home terminal 4 to access the home network via the access point AP, it is necessary for the radio communication module of the access point AP to be turned on so as to establish a radio connection and to exchange data between the home gateway 1 and the home terminal 4 in a radio manner.

An embodiment of the invention proposes that the access point AP of the home gateway 1 be placed on standby so as to save energy. The expression "placing the access point AP on standby" is understood to mean cutting off the power supply to the radio communication module of the access point AP, thereby making it possible to limit the electrical consumption of the home gateway 1. When the access point AP is placed on standby, no home terminal 4 can connect to the home gateway 1 via the access point AP. Stated otherwise, the access point AP cannot communicate by radio link when it is on standby.

The module 14 for placing the access point AP of the home gateway 1 on standby is designed to place the access point AP on standby in the event of inactivity of all the home terminals 4. Stated otherwise, all the terminals which are already parametrized with the access point AP must be inactive so as to avoid breaking a connection between one of said home terminals 4 and the home gateway via the access point AP.

A home terminal 4 is considered to be inactive if it is disconnected from the access point AP and if it does not exchange any information with said access point AP.

The memory 12 of the home gateway 1 is linked to the access point AP. With reference to FIG. 2, the memory 12 is dissociated from the access point AP but it could also be integrated into said access point AP. The memory comprises a dynamic table (not represented) in which are cataloged the connections of the home terminals 4 with the access point AP, known to the person skilled in the art under their English acronym "AID" for "Association Identifier". An association parameter AID is a unique number which makes it possible to reference a connection between a home terminal 4 and the home gateway via an access point AP. Thus, if two home terminals 4 are connected to the home network via the access point AP, the table of connections comprises two association parameters AID1, AID2.

In our example, the module 14 for placing the access point AP on standby verifies at regular time intervals whether the table of connections of the memory 12 comprises association parameters AID. If the table is empty, the module for placing on standby 14 deduces therefrom that no connection is active between the home terminal 4 and the home gateway 1 via the access point AP, the latter then being placed on standby by the module for placing on standby 14.

An energy saving solution can consist in programming the placement on standby. According to this solution, the access point AP, which is on standby, is woken up in a programmed manner by the module for placing on standby 14, that is to say it wakes up at a predetermined instant after it was placed on standby.

By way of example, the module for placing on standby is configured to wake up the access point AP as a function of the instant at which it was placed on standby. If the access point AP is placed on standby in the course of a predetermined target time period, the module for placing on standby 14 wakes up the access point AP after a determined duration of rest or at a determined instant.

By way of example, if the access point AP is placed on standby during the night, between 23 h and 6 h, the module for placing on standby 14 wakes up the access point AP only after a duration of rest of 7 h or at 8 h in the morning. In an advantageous manner, the target time period may be parametrized by the user as a function of his lifestyle and of his periods of use of the home network and of the telecommunication network via the access point AP of the home gateway 1. Likewise, the duration of rest or the instant of wakeup can also be programmed according to the user's wishes.

By way of example, the user accesses the placement on standby and wakeup parameters through a WEB interface accessible via the Internet telecommunication network or the home network.

In another energy saving solution, according to one mode of implementation of an embodiment of the invention, the access point AP is on cyclic standby. During a standby cycle, the module for placing on standby 14 alternately turns on the access point AP for a duration of activity Ta and turns it off for a duration of sleep Ts.

Hereinafter, a cycle ratio $\alpha$ is defined, corresponding to the ratio of the duration of activity Ta to the total duration of the cycle, that is to say the sum of the duration of activity Ta and of the duration of sleep Ts. The cycle ratio $\alpha$ is defined by the formula hereinbelow:

$$\alpha = \frac{Ta}{Ta + Ts}$$

For the duration of sleep Ts, the access point AP is turned off and cannot receive any data from a home terminal 4 or any other terminal. For the duration of activity Ta, the access point AP is turned on and can receive data from a home terminal 4 or any other terminal.

If a request for connection R of a terminal is received by an access point AP during its period of activity Ta, the module for placing on standby 14 wakes up the access point AP which exits its placement on cyclic standby so as to exchange data with said terminal. The access point AP will go on standby again when said terminal becomes disconnected and no other terminal is connected.

By way of example, 50% of the energy consumed by the radio interface of the access point AP is saved by placing the access point AP on cyclic standby with a cycle ratio α of the order of 0.5, this representing an appreciable saving by the home gateway 1. In contradistinction to the solution in which placement on standby is programmed, a terminal can connect immediately to the access point AP while it is on cyclic standby when its request for connection R is received during a period of activity Ta. The access point AP is unavailable solely for the duration of sleep Ts. By choosing a duration of sleep Ts of small duration, the duration of unavailability is not perceptible to the user of the terminal and for him there is no interruption of service.

To ensure a compromise between energy saving and service continuity, a cycle ratio α of between 0.2 and 0.8, preferably equal to 0.5, is advocated. Likewise, a duration of sleep Ts of between 1 ms and 100 ms, preferably equal to 50 ms, is advocated. The duration of sleep Ts is limited, on the one hand, by the maximum duration of unavailability tolerable to the user (of the order of a few hundred milliseconds) and, on the other hand, by the duration of transition from the "turned off" state to the "turned on" state of the access point AP (of the order of a few microseconds). Only the radio communication module being turned off, the transition is carried out without latency.

According to a certain aspect of this mode of implementation of an embodiment of the invention, for the duration of activity Ta, the access point AP is turned on and wakes up only on receipt of a request for connection of a home terminal 4. Any other unknown terminal, which has never connected to said access point AP, is designated a "visitor terminal" hereinafter.

The memory 12 of the home gateway 1 comprises, in addition to the table of connections, a table of identifiers comprising the unique identifiers of the home terminals 4 which have already been authorized to access the home network via the access point AP. In this example, the unique identifier of a terminal is the MAC (for "Media Access Control") unique physical address corresponding to the address of its network interface.

When a terminal connects to the home network via the access point AP, the terminal dispatches a request for connection R which comprises the MAC unique physical address of said terminal, the identifier of the home network (SSID) and an access key for the network (WEP/WPA). The access point AP records the unique physical addresses of the MAC addresses of the terminals whose access it has authorized, that is to say the home terminals 4. Thus, the memory 12 of the gateway 1 comprises a unique identifier of each home terminal 4. According to a variant of an embodiment of the invention, the table of the unique identifiers of the memory 12 comprises only the identifiers of the terminals which have connected to the access point within a determined timescale, for example, less than a week. The unique identifiers are kept temporarily so as to increase security and confidentiality.

If the access point AP, on cyclic standby, receives a request for connection R to the home network sent by an undefined terminal, the home gateway 1 compares the MAC unique identifier of the undefined terminal, which is included in the request for connection R, with the table of identifiers of the memory 12 of the home gateway 1. The access point AP wakes up in the event of correspondence (the undefined terminal is a home terminal 4) and remains on cyclic standby in the converse case (the undefined terminal is a visitor terminal). A request for connection R sent by a visitor terminal does not make it possible to wake up the access point AP on cyclic standby.

The home terminals 4 are favored while the visitor terminals are ignored. This makes it possible to advantageously increase the probability of the access point AP going on standby and promotes greater energy saving.

Indeed, if a visitor terminal wishes to connect, for example, to the Internet network via a home gateway, the visitor terminal dispatches requests for connection R to all the access points AP of all the home gateways that it detects, preventing them from going on standby. By virtue of this implementation of an embodiment of the invention, any untimely waking up of the access point AP is avoided, thus promoting energy saving.

An example of this mode of implementation of an embodiment of the invention will now be detailed with reference to FIGS. 3 and 4.

A user uses a home terminal 4, here a laptop computer 4, to access the home network via the access point AP in order to consult his emails, the access point AP being turned on (AP=ON). At regular time intervals, the access point AP consults the table of connections of the memory 12 of the gateway 1 to verify whether any home terminals 4 are still connected. This step corresponds to step E1 of the chart of FIG. 4. As long as the connection between the laptop computer 4 and the home gateway is active, the access point AP remains powered.

After having consulted his emails, the user turns off his computer 4 and leaves his home. The computer 4 is then disconnected from the access point AP. The module for placing on standby 14 reads the table of connections of the memory 12 which is empty and deduces therefrom that the home terminals 4 are inactive. The module for placing on standby 14 then places the access point AP on cyclic standby (AP=OFF) at the instant $t_0$ as represented in FIG. 3, for a duration of sleep Ts, as represented in FIG. 4.

During a standby cycle, a period of sleep of duration Ts follows a period of activity of duration Ta. With reference to FIG. 3, the cycle ratio α is equal to 0.5, the duration of a period of activity being about 50 ms.

Figure 3:
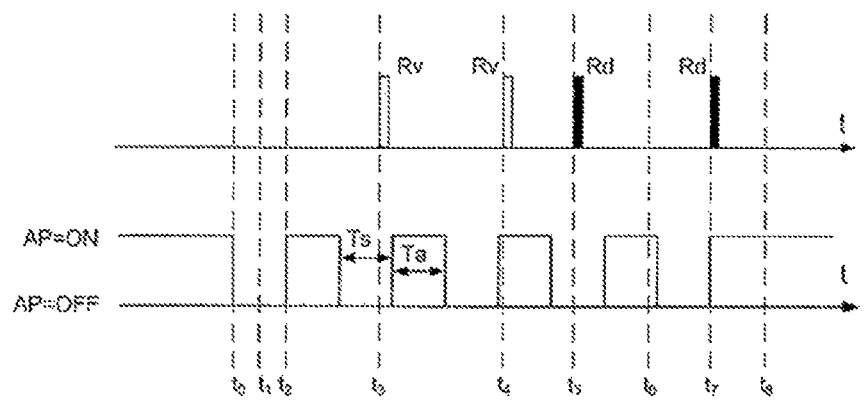
FIG. 3 is a representation of the state of operation of an access point of the home gateway of FIG. 2 as a function of the requests for connection received by home and visitor terminals.
Figure 4:
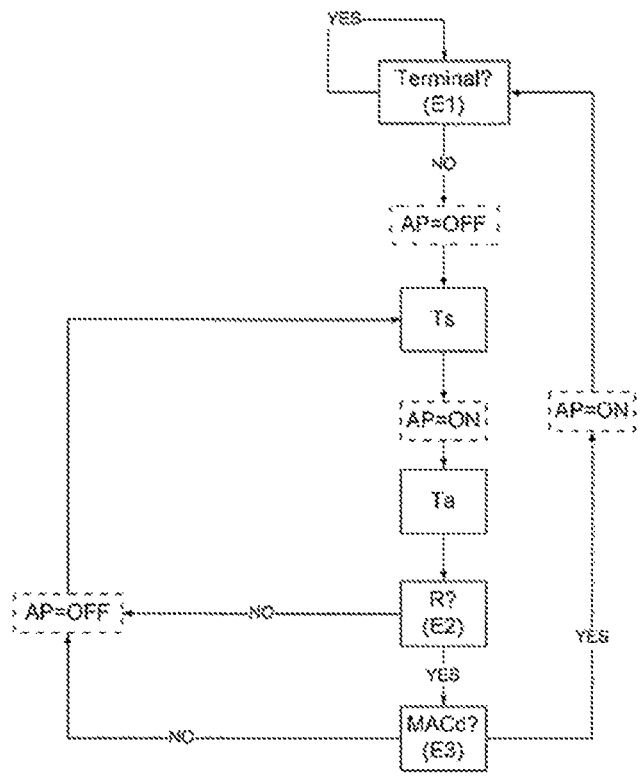
FIG. 4 is a schematic chart of the steps of the method of control (placement on standby and wakeup) of the access point according to an embodiment of the invention.

Still with reference to FIG. 3, at the instant $t_1$, the access point AP is turned off in a rest period Ts to save energy, no connection to the access point AP being possible. At the instant $t_2$, the access point AP is turned on in a period of activity Ta to verify whether a home terminal wishes to access the home network. This step corresponds to step E2 of the chart of FIG. 4 in which the access point AP is able to receive requests for connection R. Given that no request for connection is received at the instant $t_2$ during the period of activity Ta, the access point AP remains on cyclic standby and is turned off (AP=OFF) for a duration of sleep Ts.

At the instant $t_3$, a request for connection Rv is dispatched by a visitor terminal during the rest period Ts. In this example, this visitor terminal is a laptop computer of a neighbor of the user who seeks to connect to the Internet network via the home gateway 1. As the access point AP is turned off, no connection to the access point AP is carried out despite the request for connection Rv. The access point AP wakes up (AP=ON) after a duration of sleep Ts.

At the instant $t_4$, a new request for connection Rv is dispatched by the visitor terminal but this time during the period of activity Ta of the access point AP (AP=ON). The access point AP is turned on and the home gateway 1 verifies whether a terminal wishes to access the home network (Step E2). As the access point AP is turned on and since it actually receives a request for connection R, the module for placing on standby 14 passes from step E2 of FIG. 4 to step E3 in which the module for placing on standby 14 reads the MAC unique identifiers included in the requests for connection R received by the access point AP and compares them with the table of identifiers of the memory 12.

At the instant $t_4$, the module for placing on standby reads the unique identifier MACv of the request for connection Rv of the visitor terminal and compares the identifier of the visitor terminal MACv with the table of identifiers of the memory 12 of the home gateway 1. The unique identifier of the visitor terminal MACv not being included in the list of identifiers, no connection to the access point AP is carried out. The access point AP remains on cyclic standby thereby making it possible to save energy and is again turned off (AP=OFF) for a duration of sleep Ts.

When the user returns to his home, he again turns on his laptop computer 4 (home terminal) to consult his emails again. At the instant $t_5$, a request for connection Rd is dispatched by the home terminal during the period of sleep Is of the access point AP. As the access point AP is turned off, no connection to the access point AP is carried out despite the request for connection Rd of the home terminal.

At the instant $t_6$, a new request for connection Rd is dispatched by the home terminal but this time during the period of activity Ta of the access point AP (Step E2). In step E3, the module for placing on standby 14 reads the unique identifier MACd of the request for connection Rd of the home terminal and compares the identifier of the home terminal MACd with the table of identifiers of the memory 12 of the home gateway 1. As the unique identifier of the home terminal MACd is included in the list of identifiers, the access point AP is woken up (AP=ON) and the user can read his emails (Step E1). At the instant $t_8$, the access point AP remains awake, given that the laptop computer 4 is connected to said access point AP.

The user has thus woken up the access point AP in an automatic manner without performing any specific actions on the access point AP or on his laptop computer 4. The energy saving method according to an embodiment of the invention does not present any drawbacks for the user, the access point being placed on standby automatically and woken up automatically.

Still with reference to FIG. 3, the interruption of service for the user corresponds to the period between two requests for connection Rd on the part of the home terminal 4. The interruption of service of the order of 100 ms in FIG. 3 is not perceptible to the user.

The access point control method according to an embodiment of the invention thus makes it possible to limit the electrical consumption of said access point AP while preserving quality and continuity of the service provided by the access point AP.

Furthermore, such a method of placing on standby is compatible with the activity control methods which exist for the network interfaces of the home terminals of the APSD ("Automatic Power Save Delivery") type. A laptop computer 4 sometimes possesses a network interface, for example a Wifi card, which may place itself on standby in order to limit its electrical consumption when it is connected to the access point AP but that is not used for a determined time period. While the network interface is on standby, the latter is no longer powered and the home terminal disconnects from the access point AP. The access point AP also goes on standby, given that no home terminal 4 is connected. Likewise, when the laptop computer 4 wakes up, the access point AP also wakes up when a request for connection R is sent during a period of activity Ta of the cyclic standby of the access point AP.

The method of control of an access point AP according to an embodiment of the invention thus makes it possible to save energy in a manner which is synergistic with the methods of placing home terminals on standby.

Although the present disclosure has been described with reference to one or more examples, workers skilled in the art will recognize that changes may be made in form and detail without departing from the scope of the disclosure and/or the appended claims.

The invention claimed is:

1. A method of controlling a home gateway to connect at least one home terminal of a computerized home network to a telecommunication network, the home gateway comprising an access point configured to establish a WiFi connection between said home terminal and the home gateway, the method comprising acts of:
   verifying a state of the WiFi connection between the home gateway and said home terminal via the access point,
   placing said access point on cyclic standby if said WiFi connection is inactive, in which the access point is alternately turned on for a period of activity and turned off for a period of sleep, and
   waking up the access point from cyclic standby subsequent to receipt, by said access point on cyclic standby, of a request for connection to the home gateway of an undefined terminal, if the request is received during a period of activity during cyclic standby, and without prior sending of a beacon by the access point.

2. The method as claimed in claim 1, in which the access point comprises a plurality of functional modules, including a radio communication module configured to establish a radio connection between said home terminal and the home gateway, and wherein placing the access point on cyclic standby comprises placing the radio communication module of the access point on cyclic standby, in which said radio communication module is alternately turned on and turned off while the other functional modules remain turned on.

3. The method as claimed in claim 1, in which, the act of placing the access point on cyclic standby comprises a cycle ratio, corresponding to the ratio of the period of activity to a total duration of the cycle, lies between 0.2 and 0.8.

4. The method as claimed in claim 1, in which the method comprises controlling the request for connection of said undefined terminal in which the home gateway checks whether the undefined terminal is a home terminal authorized to connect to said access point, the method engages the act of waking up said access point if the undefined terminal is an authorized terminal, the method disabling the act of waking up said access point if the undefined terminal is not an authorized terminal.

5. The method as claimed in claim 1, in which the home gateway possesses a memory in which is stored at least one unique identifier of a home terminal authorized to connect to said access point, the method comprises controlling the request for connection of said undefined terminal in which:
   i) the home gateway receives the request for connection to the home gateway of the undefined terminal, the request for connection comprising the unique identifier of the undefined terminal;

ii) the home gateway compares the unique identifier of the undefined terminal, included in the request for connection, with the unique identifier of the home terminal of the memory, the home gateway engaging the act of waking up said access point in the event of correspondence and disabling the act of waking up said access point in the converse case.

6. The method as claimed in claim 1, in which the home gateway possesses a memory in which is stored a table of the connections established between the home gateway and at least one home terminal via the access point, the method comprises reading the table of connections of the memory and placing the access point on cyclic standby if the dynamic table does not comprise any connection.

7. A home gateway configured to connect at least one home terminal of a computerized home network to a telecommunication network, the gateway comprising:

- an access point configured to establish a WiFi connection between said home terminal and the home gateway;
- a memory in which is stored a dynamic table of connections between the home gateway and at least one home terminal via the access point;
- a module configured to place said access point on cyclic standby if the dynamic table does not comprise any connection, by alternately performing a turning on of said access point for a period of activity and a turning off of said access point for a period of sleep; and
- a module configured to wake up the access point from cyclic standby subsequent to receipt, by said access point on cyclic standby, of a request for connection to the home gateway of an undefined terminal, if the request is received during a period of activity during cyclic standby, and without prior sending of a beacon by the access point.

8. A non-transitory recording medium comprising a computer-readable program stored thereon to control a home gateway to connect at least one home terminal of a computerized home network to a telecommunication network, the home gateway comprising an access point configured to establish a WiFi connection between said home terminal and the home gateway, wherein the program comprises instructions configured to cause the home gateway to perform the following acts when executed by the home gateway:

- verifying a state of the WiFi connection between the home gateway and said home terminal via the access point,
- placing said access point on cyclic standby if said WiFi connection is inactive, in which the access point is alternately turned on for a period of activity and turned off for a period of sleep, and
- waking up the access point from cyclic standby subsequent to receipt, by said access point on cyclic standby, of a request for connection to the home gateway of an undefined terminal, if the request is received during a period of activity during cyclic standby, and without prior sending of a beacon by the access point.

9. A method of controlling a home gateway to connect at least one home terminal of a computerized home network to a telecommunication network, the home gateway comprising an access point configured to establish a WiFi connection between said home terminal and the home gateway, the method comprising:

- accessing, within a memory, a stored dynamic table of WiFi connections between the home gateway and at least one home terminal via the access point;
- placing said access point on cyclic standby if the dynamic table does not comprise any connection, by alternately performing a turning on of said access point for a period of activity and a turning off of said access point for a period of sleep; and
- waking up the access point from cyclic standby subsequent to receipt, by said access point on cyclic standby, of a request for connection to the home gateway of an undefined terminal, if the request is received during a period of activity during cyclic standby, and without prior sending of a beacon by the access point.

* * * * *